Jan. 19, 1954 R. P. RICHMOND 2,666,454
EXPANSION JOINT
Filed Jan. 11, 1951
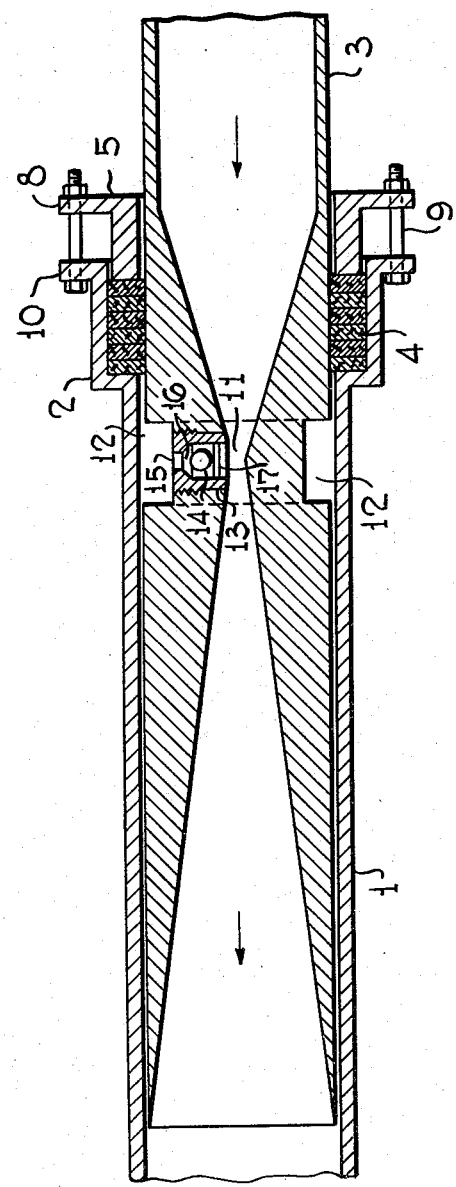
Robert P. Richmond Inventor
By W. O. Hilman Attorney Patented Jan. 19, 1954

2,666,454

UNITED STATES PATENT OFFICE 2,666,454

EXPANSION JOINT

Robert P. Richmond, Baltimore, Md., assignor to Standard Oil Development Company, a corporation of Delaware Application January 11, 1951, Serial No. 205,468

4 Claims. (Cl. 138—44)

This invention relates to expansion joints such as are used on pipe lines in situations where some allowance must be made for contraction and expansion in the pipe line. As usually constructed expansion joints allow free telescoping movement of the two connected pipe sections at the joint, but no provision is made for preventing an undue amount of expansion from dislodging the inner pipe from the outer pipe. For this reason it is necessary to construct these joints of considerable length.

The general object of this invention is to provide a simple construction for an expansion joint which will allow for the necessary movements at the joint, but which is so constructed as to prevent any possibility of the joint blowing out from an abnormally high pressure.

Further objects of the invention will appear hereinafter.

The invention consists of the novel parts and combination of parts to be described hereinafter, all of which contribute to produce an efficient expansion joint.

A preferred embodiment of the invention is described in the following specification, while the broad scope of the invention is pointed out in the appended claims.

The drawing is a vertical section through an expansion joint embodying this invention, the pipes which are connected by the joint being broken away.

In practicing the invention downstream pipe 1 of the joint is provided with a neck 2 of enlarged diameter at the end where the expansion joint is to be formed. This neck 2 receives the adjacent end of the upstream pipe 3 of the expansion joint. The inside wall of the downstream pipe 1 and the outside wall of the upstream pipe 3 are machined to a close tolerance and packing 4 is provided at the outer end of the machined joint to pack against leakage. The packing 4 is held in place by packing ring 5 which in turn is held in place by means for securing it to the downstream pipe section. This means is preferably in the form of a clamping ring 8 connected by bolts 9 to a flange 10 extending around on the outer side of the expanded neck 2. While the downstream pipe is shown to be of a larger diameter than the upstream pipe, it is of course understood that in most cases it is desirable to narrow it to the diameter of the upstream pipe. This can be done at any desired point in the line.

Upstream pipe 3 has its inner wall extended towards the center to form a Venturi throat 11. Surrounding this throat is annular chamber 12 formed in the wall of the pipe. Inserted between annular chamber 12 and Venturi throat 11 is check valve including valve cage 13 carrying ball 14 opening directly into Venturi throat 11 and communicating with annular chamber 12 through opening 15, having a diameter less than that of ball 14. A seal 16 is provided at the exit of check valve 13 into annular chamber 12. Preventing the escape of ball 14 into the Venturi throat 11 is rod or pipe 17 extending across the opening into the Venturi throat.

By means of the Venturi-throat arrangement of the upstream pipe fluid passing through the mid point of the throat is at a reduced static pressure due to the development of a high velocity head. This results in a pressure differential between the annular chamber and the Venturi throat with the result that any fluid tending to leak between the pipe walls will collect in the annular chamber and be drawn back into the flowing stream. Furthermore, the pressure upon the packing 4 is greatly reduced so that excessive leakage is further reduced.

In case the pressure in the throat of the Venturi should build up for some reason, the ball 14 will be forced against seat 16 and prevent the leakage of fluid into the annular chamber. The ball is prevented from escaping into the Venturi throat or from closing up communication between valve cage 13 and the Venturi throat by means of the rod or pipe 17. Instead of rod or pipe 17 the ball could also be prevented from closing up communication between the check valve and the Venturi throat by means of a screen or fluted opening or by other means.

It is understood that the embodiment of the invention described herein is only one of the many embodiments this invention may take, and I do not wish to be limited in the practice of the invention, nor in the claims, to the particular embodiment set forth.

The nature of the present invention having been thus fully set forth and specific examples of the same given, what is claimed as new and useful and desired to be secured by Letters Patent is:

1. In an expansion joint, the combination comprising an outer pipe member having an inlet open end, a neck portion integral with said inlet open end of enlarged diameter with respect to said pipe, an annular shoulder interiorly of said neck at the juncture thereof with said pipe member, an inner pipe member having an outlet open end insertable through said neck to be received within the inlet end of said outer member in closely spaced, reciprocally telescopic relation to the inner wall of said member and in radially spaced relation to the inner wall of said neck, forming with said neck and shoulder an annular pocket opening outwardly through said neck around said inner pipe member, a seal between said inner pipe member and said neck, including packing in said pocket, and means for compressing and retaining said packing therein, a Venturi throat interiorly of said inner member disposed longitudinally thereof intermediate the outlet end of said member and the neck portion of said outer member, a conduit passageway opening inwardly from between said pipe members, through the wall of said inner member into said Venturi throat, and a check valve in said passageway closing the passageway against flow from said throat outwardly through said passageway.

2. In an expansion joint, the combination comprising an outer pipe member having an inlet open end, a neck portion integral with said inlet open end of enlarged diameter with respect to said pipe, an annular shoulder interiorly of said neck at the juncture thereof with said pipe member, an inner pipe member having an outlet open end insertable through said neck to be received within the inlet end of said outer member in closely spaced, reciprocally telescopic relation to the inner wall of said member and in radially spaced relation to the inner wall of said neck, forming with said neck and shoulder an annular pocket opening outwardly through said neck around said inner pipe member, a seal between said inner pipe member and said neck, including packing in said pocket, and means for compressing and retaining said packing therein, an annular chamber formed between said inner and outer pipe members intermediate said neck and said outlet open end of said inner pipe member thereof, a Venturi throat interiorly of said inner member concentric with said annular chamber, a conduit passageway opening from said chamber into the throat, and a check valve in said passageway closing the passageway against flow from said throat into the chamber.

3. An expansion joint according to claim 1, in which said Venturi throat is integral with said inner pipe member, and formed by the inner walls of said outlet end thereof.

4. An expansion joint according to claim 2, in which said annular chamber comprises an annular recess in the outer wall of said inner member opening toward the inner wall of said outer member, and substantially covered thereby.

ROBERT P. RICHMOND.

References Cited in the file of this patent

UNITED STATES PATENTS

| Number | Name | Date |
|---|---|---|
| 370,606 | Chambers | Sept. 27, 1887 |
| 1,627,161 | Edwards | May 3, 1927 |
| 2,368,212 | Grant | Jan. 30, 1945 |

FOREIGN PATENTS

| Number | Country | Date |
|---|---|---|
| 590,227 | Great Britain | July 11, 1947 |